(12) United States Patent
Facchinello et al.

(10) Patent No.: US 10,322,624 B2
(45) Date of Patent: Jun. 18, 2019

(54) FRAME ASSEMBLY (71) Applicant: Tectum Holdings, Inc., Ann Arbor, MI (US)

(72) Inventors: Jerome Facchinello, Grand Blanc, MI (US); Ryan DeLong, Stockbridge, MI (US)

(73) Assignee: Tectum Holdings, Inc., Ann Arbor, MI (US)

(*) Notice: Subject to any disclaimer, the term of this patent is extended or adjusted under 35 U.S.C. 154(b) by 0 days.

(21) Appl. No.: 15/719,993

(22) Filed: Sep. 29, 2017

(65) Prior Publication Data

US 2019/0100087 A1   Apr. 4, 2019

(51) Int. Cl.
B60J 7/14 (2006.01)
B60P 7/02 (2006.01)
B60J 7/10 (2006.01)

(52) U.S. Cl.
CPC ............... *B60J 7/141* (2013.01); *B60J 7/106* (2013.01); *B60P 7/02* (2013.01)

(58) Field of Classification Search
CPC ............... B60J 7/141; B60J 7/106; B60P 7/02
USPC .................................................... 296/100.09
See application file for complete search history.

(56) References Cited

U.S. PATENT DOCUMENTS

| | | | |
|---|---|---|---|
| 5,595,417 A * | 1/1997 | Thoman | B60J 7/102 160/231.2 |
| 5,636,893 A | 6/1997 | Wheatley et al. | |
| 5,653,491 A | 8/1997 | Steffens et al. | |
| 6,227,602 B1 * | 5/2001 | Bogard | B60J 7/141 296/100.06 |
| 6,352,296 B1 | 3/2002 | Kooiker | |
| 6,527,326 B2 * | 3/2003 | Henderson | B60J 7/141 296/100.09 |
| 7,252,322 B2 | 8/2007 | Rusu | |
| 7,278,674 B1 * | 10/2007 | Bogard | B60J 7/1621 296/100.06 |
| 7,484,788 B2 | 2/2009 | Calder et al. | |
| 7,537,264 B2 | 5/2009 | Maimin et al. | |
| 8,262,148 B2 * | 9/2012 | Rusher | B60J 7/141 296/100.06 |
| 9,296,285 B2 * | 3/2016 | Copp | B60J 7/196 |
| 9,623,737 B2 * | 4/2017 | Facchinello | B60J 7/141 |
| 10,023,034 B2 * | 7/2018 | Facchinello | B60J 7/141 |
| 2004/0245799 A1 | 12/2004 | Rusu | |
| 2007/0035151 A1 | 2/2007 | Rusu | |
| 2007/0210609 A1 | 9/2007 | Maimin et al. | |
| 2008/0203756 A1 * | 8/2008 | Lake | B60J 7/1621 296/100.08 |

(Continued)

*Primary Examiner* — Gregory A Blankenship
(74) *Attorney, Agent, or Firm* — The Dobrusin Law Firm, P.C.

(57) ABSTRACT

A frame assembly that includes a first frame member, a seal, a second frame member, and a coupling mechanism. The first frame member includes a first extension and a second extension. The seal extends between a surface of the first extension and a surface of the second extension. The second frame member includes a third extension. The coupling mechanism is adapted to connect together the first frame member and the second frame member. After the first frame member and the second frame member are connected together, the first extension, the second extension, and the third extension cooperate to form a channel. The channel is adapted to receive a tonneau cover enclosure panel.

20 Claims, 4 Drawing Sheets

(56) References Cited

U.S. PATENT DOCUMENTS

| | | | |
|---|---|---|---|
| 2011/0101727 A1* | 5/2011 | Rusher | B60J 7/141 296/100.18 |
| 2013/0015678 A1 | 1/2013 | Williamson et al. | |
| 2016/0176448 A1* | 6/2016 | Germano | B60J 7/141 296/100.09 |
| 2017/0001499 A1* | 1/2017 | Facchinello | B60J 7/141 |
| 2017/0151864 A1 | 6/2017 | Facchinello et al. | |

* cited by examiner

FRAME ASSEMBLY

FIELD

These teachings relate to a frame assembly, and more particularly to a 2-piece frame assembly for supporting one or more tonneau cover enclosure panels.

BACKGROUND

A tonneau cover is a cover that is adapted to cover a cargo box of a pickup truck.

Some tonneau covers include one or more enclosure panels. The enclosure panel(s) may be supported at their edges by a frame assembly.

Exemplary frame assemblies are disclosed in US 2017/0001499 and US 2017/0151864, both of which are hereby incorporated by reference for all purposes.

To improve manufacturing and/or assembly of the tonneau cover, in some applications, it may be desirable to have a frame assembly that can be manufactured as two or more separate components and then joined together. In some of these applications, it may be desirable to have a 2-piece frame assembly that can be joined together without adhesives or mechanical fasteners. In some applications, it may be desirable to have a frame assembly with one or more integrated seals. In some applications is may be desirable to have a frame assembly that can accommodate enclosure panels having different thicknesses.

SUMMARY

These teachings provide a frame assembly. The frame assembly includes upper and lower members. The frame assembly is adapted to sandwich an enclosure panel between the upper and lower members. This sandwiching may advantageously replace or improve a step of assembling a tonneau cover where an enclosure panel is inserted or pushed into a channel of a frame. That is, inserting or pushing an enclosure panel into a channel of a frame may require high strength or force to overcome friction between the panel and the channel, especially when, for example, manufacturing tolerances of the panel thickness are on the high side and tolerances of the opening of the channel are on the low side.

Moreover, some tonneau cover assemblies include an adhesive or sealant applied on an edge of the enclosure panel and/or inside the channel. While pushing or inserting the enclosure panel into the channel, the adhesive may be "wiped" or pushed into the channel, which may thus cause the enclosure panel and channel to not be properly aligned, adhered together, and/or sealed.

According to the teachings herein, by placing an enclosure panel onto a frame member and then placing another frame member onto the enclosure panel and then connecting the two frame members together, one or more of the aforementioned challenges may be overcome.

In some applications, it may be desirable to have a frame assembly that can be manufactured as two or more separate components and then joined together. Such a frame assembly may advantageously overcome certain die-lock conditions during manufacturing of a once-piece frame assembly, which may result in less expensive tooling and/or geometry that was previously difficult or impossible to manufacture. The teachings herein provide such an advantageous frame assembly.

In some applications, it may be desirable to have a frame assembly with one or more integrated seals. This may advantageously improve or speed up assembly of the frame assembly and/or tonneau cover because the seals do not have to be manually assembled or installed in a frame assembly. The teachings herein provide such an advantageous frame assembly.

In some applications, it may be desirable to have an enclosure panel that can accommodate enclosure panels having different thicknesses. This may advantageously accommodate or forgive manufacturing tolerances of the enclosure panel. This may also provide for the frame assembly to be a single, common assembly amongst various tonneau cover assemblies that have enclosure panels with different or varying thicknesses. The teachings herein provide such a frame assembly.

The teachings provide a 2-piece frame assembly that includes a first frame member and a second frame member. The frame assembly also includes a seal and a coupling mechanism. The first frame member includes a first extension and a second extension. The seal extends between a surface of the first extension and a surface of the second extension. The second frame member includes a third extension. The coupling mechanism is adapted to connect together the first frame member and the second frame member. After the first frame member and the second fame member are connected together, the first extension, the second extension, and the third extension cooperate to form a channel. The channel is adapted to receive an enclosure panel.

The teachings provide a frame that includes a first frame member, a second frame member, and a coupling mechanism. The first frame member comprises a first extension and a second extension. The second frame member is discrete from the first frame member. The second frame member comprising a third extension. The coupling mechanism adapted to connect together the first frame member and the second frame member. After the first frame member and the second frame member are connected together, the first extension, the second extension, and the third extension cooperate to form a channel. The channel is adapted to receive an enclosure panel. The third extension comprises a bulb seal disposed on a surface opposing the inside of the channel.

The teachings provide a frame that includes a first frame member, a seal, a second frame member, and a coupling mechanism. The first frame member comprising a first extension and a second extension. The seal extends between a surface of the first extension and an adjacent surface of the second extension. The second frame member is discrete from the first frame member. The second frame member comprises a third extension. The coupling mechanism is adapted to connect together the first frame member and the second frame member. After the first frame member and the second frame member are connected together, the first extension, the second extension, and the third extension cooperate to form a channel. The channel is adapted to receive an enclosure panel. The enclosure panel is adapted to compress the seal after the enclosure panel is received in the channel. The third extension comprises a bulb seal disposed on a surface opposing an inside of the channel. The third extension comprises a first seal located on the surface opposing the inside of the channel, and a second seal located on the surface opposing the inside of the channel.

DETAILED DESCRIPTION

The tonneau cover according to these teachings may be a cover that is adapted to be placed over a cargo box of a vehicle, such as a pick-up truck. The tonneau cover may also be adapted to be placed inside a vehicle, for example, to cover an interior trunk or cargo space of a vehicle such as a station wagon or SUV.

The frame assembly may be adapted to house, support, contain, and/or stabilize one or more enclosure panels of the tonneau cover. The frame assembly may function to elevate one or more enclosure panels from a top end of the cargo bed, a top end of the fenders or walls that define the cargo bed, and/or a top end of the tailgate. This may be desired so that the top end of the cargo bed, and/or the top end of the fenders and/or the top end of the tailgate do not become damaged due to contact with the tonneau cover or enclosure panel(s). Moreover, when installing the tonneau cover and/or moving the tonneau cover between an open and closed configuration, the frame assembly may function to prevent hard contact (i.e., slamming) of the tonneau cover or enclosure panel against the top end of the cargo bed, the top end of the fenders or walls that define the cargo bed, and/or the top end of the tailgate so that damage thereto and/or to the tonneau cover is prevented. The frame assembly may function to connect together adjacent enclosure panels.

The frame assembly may be provided around or may be located around an entire perimeter of the tonneau cover. Alternatively, the frame assembly may be provided only in certain portions or sections around the perimeter of the tonneau cover. For example, the frame assembly may be provided every few includes or every few feet around the perimeter of the tonneau cover. For example, the frame assembly may be located only in the areas of the fenders of the cargo bed; at the tailgate; at the bulkhead where the cargo bed and the cab of the vehicle meet; or a combination thereof.

The frame assembly may be located in between the tailgate and the bulkhead where the cargo bed and the cab of the vehicle meet to provide additional structural rigidity to the enclosure panels, the tonneau cover, or a combination thereof.

The frame assembly may be comprised of two or more discrete or individual pieces. Discrete may mean that the frame members are separate pieces that are joined together to form the frame assembly. Discrete may man that the members are manufactured separately and subsequently jointed together. Discrete may mean that the members are manufactured together and attached, separated, and then subsequently joined together to create the frame assembly.

Providing the frame assembly as two or more pieces may be advantageous in that complex geometries can be manufactured without yielding to die lock conditions. Moreover, providing the frame member as two or more discrete pieces provides for an alternative method of assembling. Stated another way, by having two discrete pieces, an enclosure panel can be set or placed onto a first frame member, and then another frame member can be placed onto the enclosure panel and connected to the first frame member. This can help ensure that the enclosure panel is properly situated in the frame assembly. That is, previously, some enclosure panels were slid or forced into a U-channel. However, if the enclosure was not forced all the way into the U-channel, opportunities for gaps between an edge of the enclosure panel and the U-channel existed, which may result in passage ways for water to flow around, a less than secure connection between the frame and the enclosure panel; or a combination thereof.

Furthermore, providing the frame member as two or more discrete pieces provides for disassembling the tonneau cover and/or frame assembly in the advent service to the enclosure panel and/or frame assembly is required. For example, if an enclosure panel needs to be replaced, having a frame member that can be disassembled may provide for a quick and easy way to do so, without having to disassemble an entire tonneau cover assembly.

The frame assembly comprises a coupling mechanism. The coupling mechanism may function to connect together the discrete frame members. The coupling mechanism may function to provide for various thicknesses of enclosure panels to be supported by the frame assembly. That is, because one of the frame, members comprises a receptacle with a number of catches, depending on which catch the finger on the other frame member engages dictates the size of the opening of the channel. This may be advantageous in that the same frame assembly can be used for different tonneau cover styles or thickness of enclosure panels. This may also be advantages in that manufacturing tolerances of the enclosure panel and/or frame members can be taken up by customizing which catch the finger engages. The receptacle and catches may be located on the first frame member and the finger may be located on the second frame member, or vice versa.

Each of the frame members comprise one or more extensions. The extensions may be elongated members that are generally parallel to other extensions located on the other frame member; generally perpendicular to other extensions located on the other frame member; or otherwise angularly orientated relative to other extensions located on the other frame member. Otherwise angularly orientated may mean that one extension relative to another extension is neither perpendicular nor parallel, but instead arranged at another angle relative to another extension. The extensions may be generally elongated or linear, or the extensions may be curved or non-linear.

The frame assembly, or the one or more extensions, or one or more surfaces of the extension may comprise one or more areas of a sealant or adhesive. The sealant or adhesive may function to help adhere, bond, secure, and/or connect an enclosure panel to the corresponding frame member. The sealant or adhesive may assist in properly locating or positioning the enclosure panel relative to the frame member and/or the frame members to each other before the tonneau cover is completely assembled. The sealant or adhesive may function to seal, restrict, and/or prevent particles, water, containments, and the like from entering the channel or getting between the frame member(s) and the enclosure panel(s). The adhesive or sealant may be applied via a bead or liquid, tape, or both.

The frame assembly may comprise one or more seals. The one or more seals may be located entirely on one extension or surface, or may extend from one extension or surface to an adjacent extension or surface. The seal may function to contact an enclosure panel. The seal may function to prevent particles, water, or other contaminants from traveling around an edge of an enclosure panel. The seal may function to create a water-tight fit between the channel and the enclosure panel. The seal may be formed from a suitable material that is compressible and elastic. For example, the material may be may be made of a thermoplastic olefin (TPO), elastomeric, rubber, or other suitable flexible, bias-able, compressible, elastic, and/or resilient material.

The frame assembly may comprise a bulb seal. The bulb seal may function to provide a seal or cushion for the frame assembly and/or the tonneau cover to rest on the surfaces of the tailgate, the fenders of the cargo box, or both. The bulb seal may be sandwiched between the enclosure panels and the top surfaces of the tailgate, fenders, or both. The bulb seal may function to at least partially collapse under the weight of the tonneau cover. The bulb seal may function as a damper to prevent noise, rattle, or vibration of the enclosure panel or tonneau cover against the cargo bed or tailgate. The bulb seal may function to seal, restrict, and/or prevent particles, water, containments, and the like from entering the cargo box.

The bulb seal may have any cross-sectional shape: circular, oval, triangular, etc. The bulb seal may extend along an entire length of the frame assembly (i.e., wherever there is a frame assembly there is a bulb seal). Alternatively, the bulb seal may extend only in select portions. That is, the bulb seal may be located only in certain areas, for example, every few inches or feet along a length of the frame assembly. This may be an advantageous cost savings. The bulb seal may be may be made of a suitable material, such as a thermoplastic olefin (TPO), elastomeric, rubber, or other suitable flexible, bias-able, compressible, elastic, and/or resilient material.

One or more seals may extend from one of the extensions. For example, while the drawings illustrate two seals extending from the third extension, there may be one seal, or more than two seals extending from the extension. The extensions may extend from any suitable angle from the extension. For example, one or more of the extensions may be generally perpendicular to the corresponding extension from which it extends. Alternatively, one or more of the seals may be angled relative to the extension. If there are a plurality of seals, some or all of the seals may extend from the extension at the same angle. If there are a plurality of seals, some or all of the seals may extend from the extension at different angles. The angle may be on the order of about 20 degrees or more, 30 degrees or more, 45 degrees or more, 60 degrees or more, 75 degrees or more, 90 degrees or more, 100 degrees or more, 120 degrees or more, 135 degrees or more, 150 degrees or more, or even 175 degrees or more.

One or more of the seals, areas having sealant or adhesive, bulb seals, etc. of the frame assembly may be omitted or removed from the frame assembly.

One or more of the extensions may comprise an undercut portion. The undercut portion may assist in retaining the enclosure panel in the channel or frame assembly during or after assembly. The undercut portion may be a material bulge or protrusion that extends beyond a surface of the extension into the channel or receiving section. The undercut portion may contact, "bite" into, or engage a top layer of the enclosure panel to provide a secure connection between the panel and the frame assembly.

The tonneau cover may comprise one or more enclosure panels. That is, the tonneau cover may comprise a single enclosure panel that covers some or all of the cargo box. Alternatively, the tonneau cover may comprise two or more adjacently located panels that are connected together with the frame assembly, a rail or other connector, or a combination thereof.

An enclosure panel may comprise a core. The core may be made of a suitable material, such as a light weight and sturdy plastic material. The core may be an extruded polypropylene material.

An enclosure panel may comprise a skin that is placed over a top surface, bottom surface, edges, or a combination thereof. the skin may be made of a suitable material such as a thermoplastic polyurethane (TPU), Thermoplastic vulcanizate (TPV), thermoplastic elastomer (TPE), and/or a thermoplastic rubber (TPR).

Figure 1:
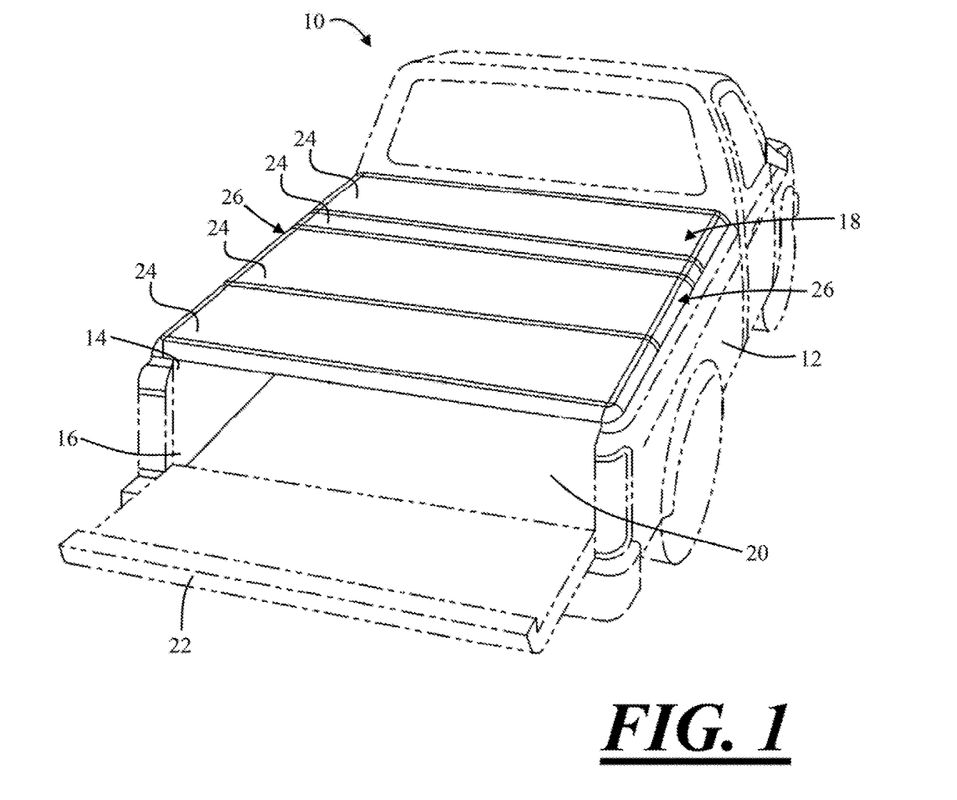
FIG. 1 is a perspective view of a vehicle and a tonneau cover comprising a frame assembly.

FIG. 1 illustrates a vehicle 10. The vehicle 10 comprises a cargo box 12. The cargo box 12 comprises a top end 14 and a back end 16. A tonneau cover 18 is adapted to be placed over the cargo box 12 and cover the top end 14 of the cargo box 12 to protect against dirt, debris, and other contaminants from entering an inside 20 of the cargo box 12. The vehicle 10 includes a tailgate 22 that is adapted to cover the back end 16 of the cargo box 12.

Figure 3:
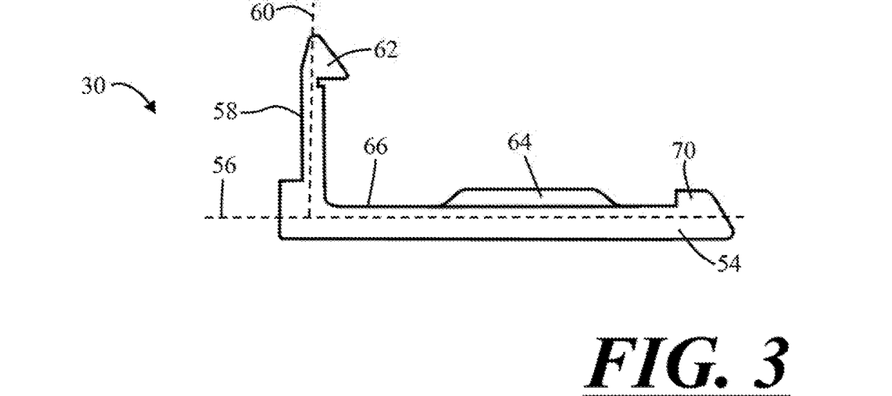
FIG. 3 is a cross-sectional view of a second frame member of the frame assembly.
Figure 4:
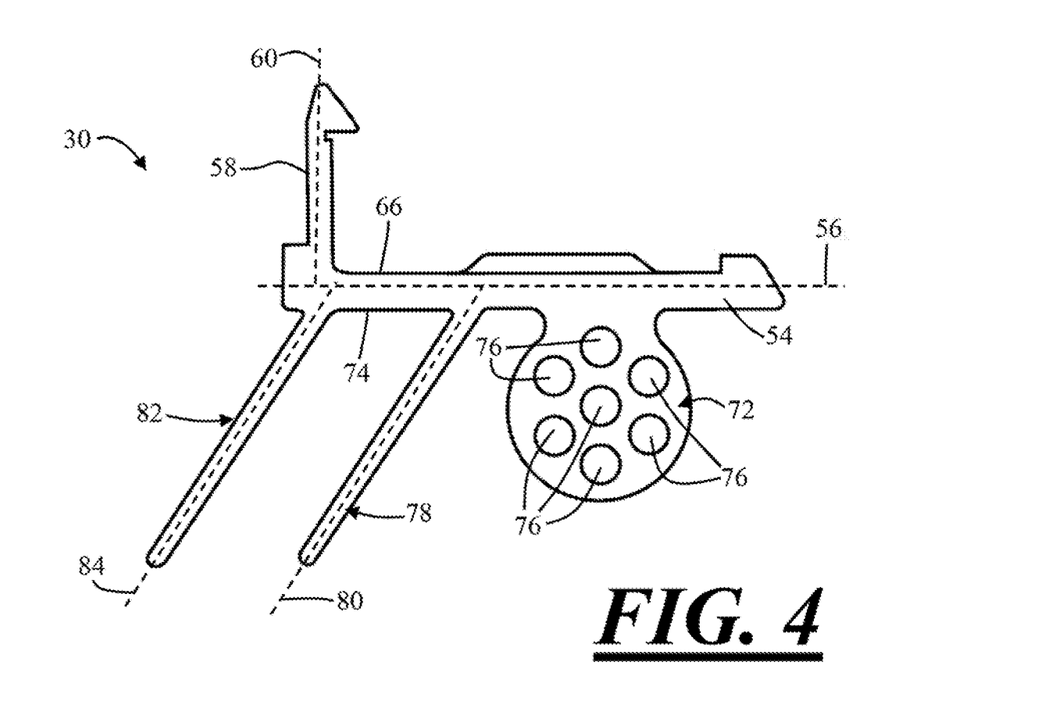
FIG. 4 is a cross-sectional view of another second frame member of the frame assembly.

The tonneau cover 18 comprises one or more enclosure panels 24. One or more of the enclosure panels 24 are supported by a frame assembly 26. The frame assembly 26 may be placed on the top end 14 of the carpo box 12. More specially, the frame assembly 26 is located on top of the fenders or walls that define the carbo box 12. The frame assembly 26 comprises a first frame member 28 (FIG. 2) and a second frame member 30 (FIGS. 3, 4).

Figure 2:
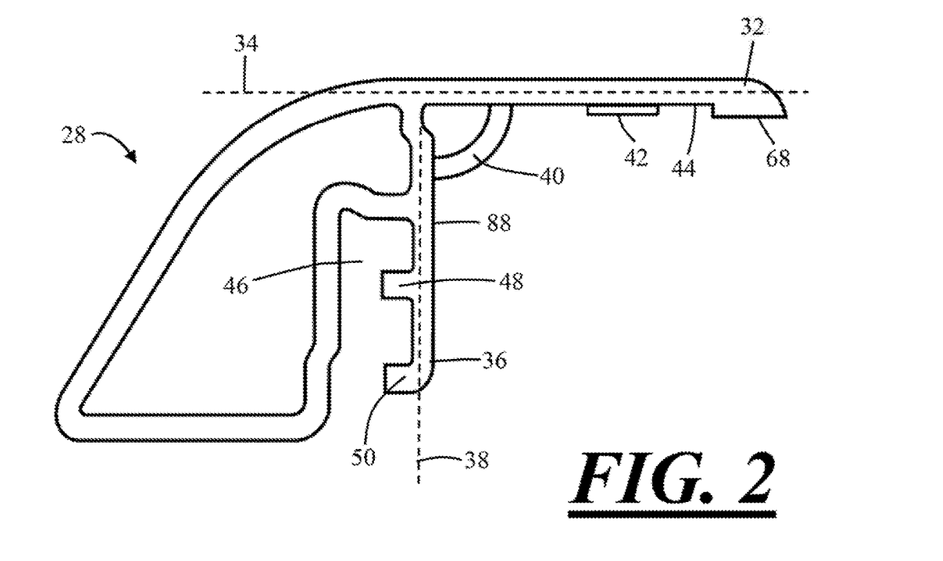
FIG. 2 is a cross-sectional view of a first frame member of the frame assembly.

FIG. 2 illustrates the first frame member 28. The first frame member 28 comprises a first extension 32 extending along a first plane 34, and a second extension 36 extending along a second plane 38. The first plane 34 and the second plane 38 are generally perpendicular to each other. The first frame member 28 comprises a seal 40 that extends between a surface 44 of the first extension 32 and a surface 88 of the second extension 36. In some configurations, the seal 40 may be optional. The first extension 32 may include an optional full perimeter of sealant or adhesive 42 disposed on the surface 44, or a bead of sealant or adhesive 42 disposed on the surface 44. For example, the sealant or adhesive 42 may be an adhesive tape disposed on surface 44 to help bond or attach the first frame member 28 to an enclosure panel 24 (FIG. 4). The surface 44 may also include an undercut portion 68. Surface 88 may likewise include a similar bead of sealant or adhesive to the sealant or adhesive 42 illustrated on surface 44.

With continued reference to FIG. 2, the first frame member 28 comprises a receptacle 46, a first catch 48, and a second catch 50. While FIG. 2 illustrates the first frame member 28 having two catches 48, 50, the first frame member 28 can include any number of catches, including one catch, three or more catches, four or more catches, and so on. The receptacle 46, the first catch 48, and the second catch 50 are part of a coupling mechanism 52, which is used to attach the first and second frame members 28, 30 together, as described in greater detail at FIG. 6.

The first frame member 28 may be made of a rigid plastic material, such as polypropylene (PP), polyvinyl chloride (PVC), or nylon. The first frame member 28 may be made of a metal, such as aluminum. The first frame member 28 may be formed by a suitable manufacturing process, such as, for example extrusion, injection molding, long fiber injection (LFI) or the like.

Figure 6:
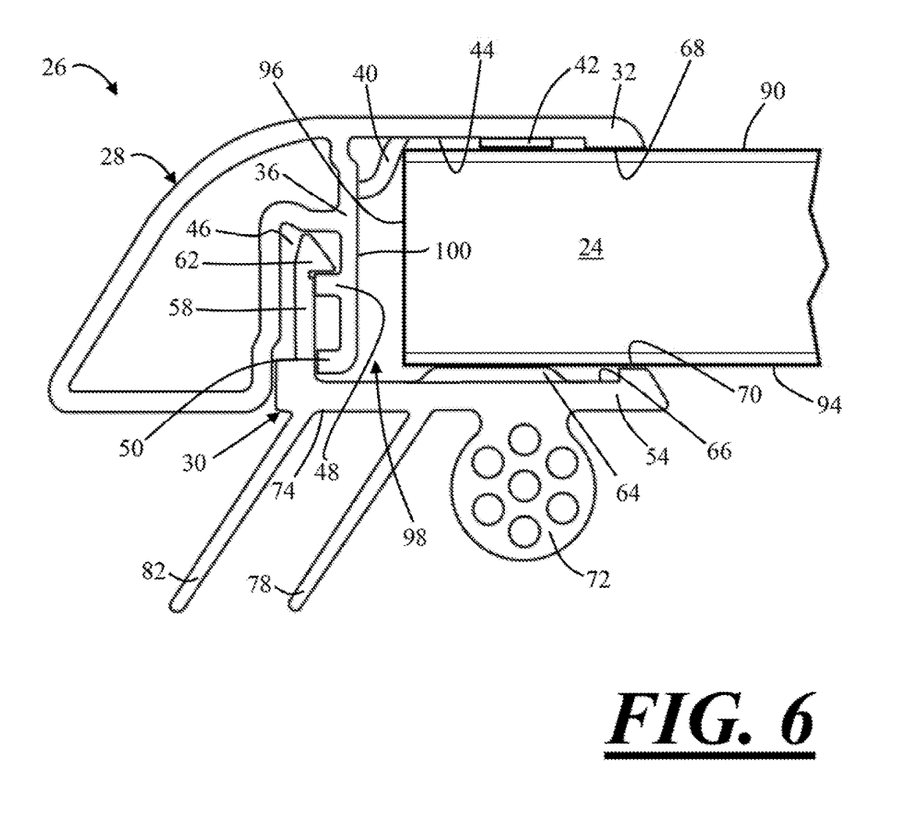
FIG. 6 is a cross-sectional view of the assembled frame assembly supporting an enclosure panel.

FIG. 3 illustrates the second frame member 30. The second frame member 30 is a discrete component from the first frame member 28. The second frame member 30 comprises a third extension 54 extending along a third plane 56, and a fourth extension 58 extending along a fourth plane 60. The fourth extension 58 is a finger that includes a latch portion 62. The fourth extension 60 and latch portion 62 are part of the coupling mechanism, which is used to attach the first and second frame members 28, 30 together, as described in greater detail at. FIG. 6.

The third plane 56 and the fourth plane 60 are generally perpendicular to each other. The third plane 56 is generally parallel to the first plane 34 and generally perpendicular to the second plane 38 (FIG. 2). The fourth plane 60 is generally perpendicular to the first plane 34 and generally parallel to the second plane 38 (FIG. 2).

Figure 5:
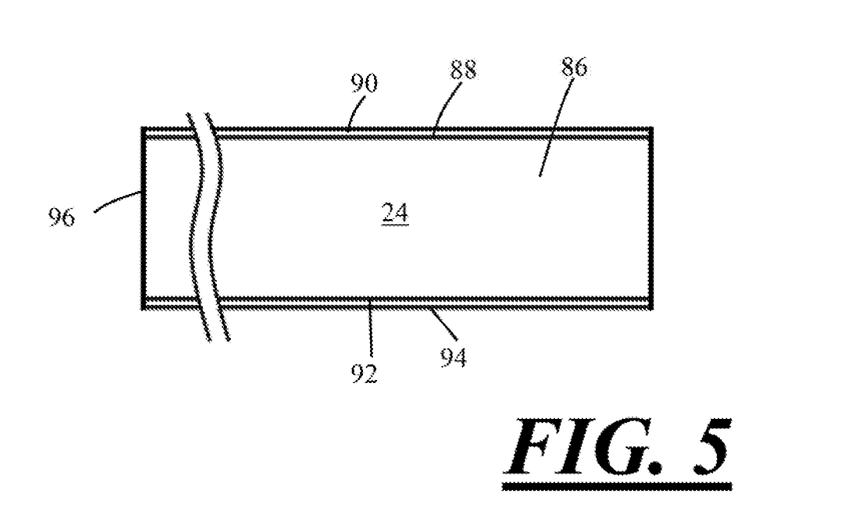
FIG. 5 is a partial cross-sectional view of an enclosure panel.

With continued reference to FIG. 3, the third extension 54 may comprise an optional full perimeter of sealant or adhesive 64 disposed on surface 66, or a head of sealant or adhesive 64 disposed on surface 66. For example, an adhesive tape can be disposed on surface 66 to help bond or attach the second frame member 30 to panel 24 (FIGS. 5, 6). However, the sealant or adhesive 64 is optional. Surface 66 of the third extension 54 may also comprise an undercut portion 70.

FIG. 4 illustrates the second frame member 30. The second frame member 30 of FIG. 4 is substantially similar to the second frame member 30 described above and illustrated in FIG. 3, and, therefore, in the interest of brevity, similar features between FIGS. 3 and 4 will not be described again. The second frame member 30 of FIG. 4 adds a bulb seal 72 and seals 78 and 82. One or both of the seals 78 and 82 may be optional.

The bulb seal 72 extends from a bottom surface 74 of extension 54. Surface 74 is generally opposite surface 66 of extension 54. The bulb seal 72 may comprise one or more apertures 76 that may be adapted to provide for the bulb seal 72 to at least partially compress or collapse when the panel 24 is attached to the frame assembly 26 (FIG. 6) and frame assembly 26 is resting on the top end 14 of the cargo box 12. That is, the bulb seal 72 may be adapted to collapse or compress between the enclosure panels and the cargo box under a weigh of the enclosure panels. While the bulb seal 72 is shown in FIG. 4 as being generally circular, the bulb seal 72 may have a different shape, such as, for example, an oval shape, a D-shape, etc.

The bulb seal 72 may be made of a thermoplastic olefin (TPO), elastomeric, rubber, or other suitable flexible, biasable, compressible, elastic, and/or resilient material.

The bulb seal 72 (and/or seals 78, 82) may be integrally formed with the second frame member 30, for example, by an extrusion, co-extrusion, injection molding, or a 2-shot injection molding process. By integrally forming seal 72 and/or seals 78, 82, an assembly step of attaching the seal 72 and/or 78, 82 after the second frame member 30 is made may be removed from the assembly process, which may advantageously reduce time and expense, and possibly improve quality. Alternatively, the bulb seal 72 and/or seals 78, 82 may be a separate component that is secured to surface 74 of extension 54 by way of a mechanical fastener, an adhesive, or an adhesive tape.

The first seal 78 extends from the third extension 54 along a first seal plane 80, and the second seal 82 extends from the third extension 54 along a second seal plane 84. The first seal plane 80 and the second seal plane 84 are generally parallel to each another. The first seal plane 80 and the second seal plane 84 are generally different than any of the first plane 34, second plane 38, third plane 56, and fourth plane 60.

One or both of the seals 78, 82 may be made of a thermoplastic olefin (TPO), elastomeric, rubber, or other suitable flexible, bias-able, and/or resilient material.

FIG. 5 illustrates an exemplary enclosure panel 24. The enclosure panel 24 comprises a center core 86. A top surface 88 of the core 86 may be covered with a top skin material 90. A bottom surface 92 of the core 86 may also be covered with a bottom skin material 94. However, some enclosure panels 24 only include the core 86 or one of the top skin 90 or bottom skin 94. Each enclosure panel includes an edge 96.

FIG. 6 illustrates the assembled frame assembly 26 and the panel 24 received in the channel or receiving section 98. The frame assembly 26 comprises the first frame member 28 and the second frame member 30. While FIG. 6 illustrates the second frame member 30 of FIG. 4, it is understood that the frame member 30 illustrated in FIG. 3 can be used to create the frame assembly 26.

To assemble the frame assembly 26 and the panel 24, the first frame member 28 and the second frame member 30 are brought together such that the fourth extension 58 or finger is received into the receptacle 46 until the latch portion 62 engages either the first catch 48 or the second catch 50. In the assembled configuration, the frame assembly 26 comprises a C-shaped channel or receiving section 98 that is defined by surface 44 of the first extension 32, surface 100 of the second extension 36, and surface 66 of the third extension 54. An enclosure panel 24 may then be inserted into the channel or C-shaped receiving section 98 until edge 96 of the enclosure panel 24 contacts and compresses the seal 40.

Alternatively, to assemble the frame assembly 26 and the panel 24, with the first and second frame members 28 30 separated, the enclosure panel 24 may be placed onto the first frame member 28 such that the edge 96 of the enclosure panel 24 contacts and compresses the seal 40. The second frame member 30 may then be brought into contact with the enclosure panel 24 until the fourth extension 58 or finger is received into the receptacle 46 and the latch portion 62 engages either the first catch 48 or the second catch 50. This type of assembly may be advantageous over the assembly steps described above, which may require greater force to overcome the friction between the panel 24 and the C-shaped receiving section 98 when pushing or inserting the panel 24 into the receiving section 98. Moreover, this assembly step may be advantageous in that any adhesive or sealant on the first or second frame member 26, 28 is not wiped or pushed deep into the receiving section, which may be the case if the panel 24 is slid into the C-shaped receiving section 98 as discussed above.

Alternatively, to assemble the frame assembly 26 and the panel 24, the enclosure panel 24 may be placed onto the second frame member 30, and then the first frame member 28 may be brought into contact with the enclosure panel 24 until the receptacle 46 is received onto the fourth extension 58 or finger and the latch portion 62 engages either the first catch 48 or the second catch 50.

During assembly of the frame assembly 26, the latch portion 62 may engage the first catch 48 to accommodate a thinner enclosure panel 24, or the latch portion 62 may be engage the second catch 50 to accommodate a thicker enclosure panel 24. In other words, when the latch portion 26 engages the first catch 48, the spacing between surfaces 44 and 66 is smaller than the spacing between surfaces 44 and 66 when the latch portion 26 engages the second catch 50. As was discussed above, the first frame member 28 can include any number of catches to accommodate enclosure panels 24 having various thicknesses. This may advantageously provide for using a single frame assembly 26 for accommodating panels 24 having varying thicknesses due to manufacturing inconsistences or tolerances, and/or panels 24 that are intended to have different thickness depending on a particular model or type of tonneau cover.

Regardless of how the panel 24 and the frame assembly 26 are assembled, the enclosure panel 24 is adapted to be supported inside the C-shaped receiving section 98 such that the first extension 32 and/or the undercut portion 68 and the third extension 54 and/or the undercut portion 70 apply opposing compressive forces on the corresponding skins 90, 94 of the enclosure panel 24. Such compressive forces advantageously ensure that the panel 24 is securely held by the frame assembly 26. Such compressive forces advantageously ensure that gaps or channels that may restrict or prevent water or other debris from flowing around the edge 96 of the panel 24 and into the cargo box 12.

Once assembled, a weight of the enclosure panel 24 may cause the bulb seal 72, the first seal 78, the second seal 82, or a combination thereof to compress and seal, against the cargo box 12 of the vehicle 10.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

By use of the term "may" herein, it is intended that any described attributes that "may" be included are optional.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or features relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The disclosures of all articles and references, including patent applications and publications, are incorporated by reference for all purposes. Other combinations are also possible as will be gleaned from the following claims, which are also hereby incorporated by reference into this written description.

LISTING OF REFERENCE NUMERALS 10 vehicle
12 cargo box
14 top end
16 back end
18 tonneau cover
20 inside of cargo box
22 tailgate
24 enclosure panels
26 frame assembly
28 first frame member
30 second frame member
32 first extension
34 first plane
36 second extension
38 second plane
40 seal
42 bead of adhesive or sealant
44 surface
46 receptacle
48 first catch
50 second catch
54 third extension
56 third plane
58 fourth extension
60 fourth plane
62 latch portion
64 bead of adhesive or sealant
66 surface
68 undercut portion
70 undercut portion
72 bulb seal
74 surface
76 apertures
78 first seal
80 fist seal plane
82 second seal
84 second seal plane
86 center core
88 top surface of center core 86
90 top skin
92 bottom surface of center core 86
94 bottom skin
96 edge
98 C-shaped receiving section
100 surface

The invention claimed is:
1. A frame assembly comprising:
a first frame member comprising a first extension and a second extension;
a second frame member comprising a third extension;

a coupling mechanism adapted to connect together the first frame member and the second frame member;

wherein after the first frame member and the second frame member are connected together, the first extension, the second extension, and the third extension cooperate to form a channel;

wherein the channel is adapted to receive an enclosure panel of a pickup truck tonneau cover;

wherein the frame assembly comprises a bulb seal that is integrally formed with the second frame member.

2. The frame assembly according to claim 1, wherein the frame assembly comprises a seal that extends at an angle between the first extension and the second extension, the enclosure panel is adapted to compress the seal after the enclosure panel is received in the channel.

3. The frame assembly according to claim 1, wherein the first extension extends along a first plane, the second extension extends along a second plane, and the third extension extends along a third plane;

wherein the first plane and the second plane are generally perpendicular to each other, and the third plane is generally parallel to the first plane; and wherein the frame assembly comprises a seal that extends between the first extension and the second extension along another plane that is angularly different than the first plane, the second plane, and the third plane.

4. The frame assembly according to claim 1, wherein the coupling mechanism comprises a finger comprising a latch portion, and a receptacle comprising two catch features, wherein the latch portion is adapted to engage one of the two catch features to connect together the first frame member and the second frame member.

5. The frame assembly according to claim 4, wherein the frame assembly comprises a first seal, the first seal extends from the third frame member at a location that is generally aligned with the finger.

6. The frame assembly according to claim 1, wherein the bulb seal comprises a plurality of apertures that are arranged in a circular shape.

7. The frame assembly according to claim 6, wherein the bulb seal comprises a center aperture, and the plurality of apertures are arranged around the center aperture to form the circular shape.

8. The frame assembly according to claim 5, wherein the frame assembly comprises a second seal that is located between the first seal and the bulb seal.

9. The frame assembly according to claim 8, wherein the first seal, the second seal, and the third seal are integrally formed with the second frame member.

10. A frame comprising:
a first frame member comprising a first extension and a second extension;
a seal extending between the first extension and the second extension such that a corner defined at an intersection of the first extension and the second extension is free from contact by the seal;
a second frame member comprising a third extension;
wherein the first extension, the second extension, and the third extension cooperate to form a channel;
wherein the channel is adapted to receive a tonneau cover enclosure panel.

11. The frame according to claim 10, wherein the seal extends along a non-linear path between the first extension and the second extension.

12. The frame according to claim 10, wherein the frame assembly comprises a coupling mechanism adapted to connect together the first frame member and the second frame member, the coupling mechanism comprises a finger comprising a latch portion, and a receptacle comprising two catch features, the latch portion is adapted to engage one of the two catch features to connect together the first frame member and the second frame member, and wherein a first seal extends from the third extension from a location generally aligned with the finger.

13. The frame according to claim 10, wherein the corner is free from contact by the seal after the tonneau cover enclosure panel is received in the channel.

14. The frame according to claim 10, wherein the seal has a length that is defined between a first seal end and a second seal end, the first seal end is connected to the first extension, and the second seal end is connected to the second extension.

15. A frame comprising:
a first frame member comprising a first extension and a second extension;
a seal that extends between a surface of the first extension and an adjacent surface of the second extension such that a corner defined by the first extension and the second extension is free of contact by the seal;
a second frame member that is discrete from the first frame member, the second frame member comprising a third extension;
a coupling mechanism adapted to connect together the first frame member and the second frame member;
wherein after the first frame member and the second frame member are connected together, the first extension, the second extension, and the third extension cooperate to form a channel;
wherein the channel is adapted to receive a tonneau cover enclosure panel;
wherein the enclosure panel is adapted to compress the seal after the enclosure panel is received in the channel; and
wherein the third extension comprises a bulb seal disposed on a surface opposing an inside of the channel;
wherein the third extension comprises a first seal located on the surface opposing the inside of the channel, and a second seal located on the surface opposing the inside of the channel.

16. The frame according to claim 15, wherein the first extension extends along a first plane, the second extension extends along a second plane, and the third extension extends along a third plane;
wherein the first plane and the second plane are generally perpendicular to each other, and the third plane is generally parallel to the first plane;
wherein the first seal extends along a first seal plane, and the second seal extends along a second seal plane, and the first seal plane and the second seal plane are generally parallel to each other.

17. The frame according to claim 16, wherein both of the first seal plane and the second seal plane are different than any of the first plane, the second, plane, and the third plane, and and
wherein the seal extends along a plane that is angularly different than the first seal plane and the second seal plane.

18. The frame according to claim 15, wherein the seal extends along a curved path between the first extension and the second extension.

19. The frame assembly according to claim 15, wherein the first seal, the second seal, and the third seal are integrally formed with the second frame member.

20. The frame according to claim 15, wherein the coupling mechanism comprises a finger comprising a latch portion, and a receptacle comprising two catch features,
> wherein the latch portion is adapted to engage one of the two catch features to connect together the first frame member and the second frame member, and
> wherein the first seal extends from the third frame member from a location aligned generally below the finger.

\* \* \* \* \*